(12) United States Patent
Ames, II et al.

(10) Patent No.: US 8,412,369 B2
(45) Date of Patent: Apr. 2, 2013

(54) MULTIPLE PRODUCT, MULTIPLE STEP OPTIMIZATION METHODS

(75) Inventors: Daniel E. Ames, II, Morrow, OH (US); Robert Leslie Hunt, Attalens (CH); Wayne R. Peterson, Eureka, MO (US)

(73) Assignee: Nestec S.A., Vevey (CH)

( * ) Notice: Subject to any disclaimer, the term of this patent is extended or adjusted under 35 U.S.C. 154(b) by 294 days.

(21) Appl. No.: 12/450,847

(22) PCT Filed: Mar. 27, 2008

(86) PCT No.: PCT/US2008/003990
§ 371 (c)(1), (2), (4) Date: Oct. 15, 2009

(87) PCT Pub. No.: WO2008/130476
PCT Pub. Date: Oct. 30, 2008

(65) Prior Publication Data
US 2010/0100216 A1    Apr. 22, 2010

(51) Int. Cl.
G06F 19/00  (2011.01)
G01N 33/48  (2006.01)
A01K 43/00  (2006.01)

(52) U.S. Cl. ............... 700/103; 702/19; 426/231

(58) Field of Classification Search .............. 700/103, 700/107; 702/19; 426/231
See application file for complete search history.

(56) References Cited

U.S. PATENT DOCUMENTS

| | | | |
|---|---|---|---|
| 6,156,355 A | 12/2000 | Shields, Jr. et al. | |
| 6,665,567 B2* | 12/2003 | Iraschko | 700/36 |
| 6,805,074 B2* | 10/2004 | Newcomb et al. | 119/51.01 |
| 6,810,291 B2* | 10/2004 | Card et al. | 700/48 |
| 2003/0004655 A1 | 1/2003 | Singh et al. | |
| 2005/0131753 A1* | 6/2005 | Versch | 705/10 |

OTHER PUBLICATIONS

Search Report for Application No. PCT/US2008/003990 dated Feb. 25, 2011.

\* cited by examiner

*Primary Examiner* — Sean Shechtman
(74) *Attorney, Agent, or Firm* — Julie M. Lappin; Robert M. Barrett

(57) ABSTRACT

Multiple product, multiple step optimization methods useful for manufacturing products. The optimization methods comprise defining a first group and a second group. The first and second groups each comprise at least two subgroups. One or more of the subgroups for each group comprises one or more variables and one or more constraints. The variables are optimized to obtain final values for the variables based on a defined objective subject to the constraints.

18 Claims, 3 Drawing Sheets

Example Solution

| GROUP 1 | |
|---|---|
| SUBGROUP 1A | |
| | % |
| Ingredient 1 | 83 |
| Ingredient 2 | 7 |
| Ingredient 3 | 10 |
| | |
| SUBGROUP 1B | |
| | % |
| Ingredient 4 | 20 |
| Ingredient 5 | 10 |
| Ingredient 6 | 70 |
| | |
| SUBGROUP 1C | |
| | % |
| Subgroup 1A | 50 |
| Subgroup 1B | 50 |
| | |
| Group 1 | % |
| | |
| Subgroup 1C | 91 |
| Ingredient 7 | 7 |
| Ingredient 8 | 2 |

| GROUP 2 | |
|---|---|
| SUBGROUP 2A | |
| | % |
| Ingredient 1 | 70 |
| Ingredient 3 | 5 |
| Ingredient 9 | 25 |
| | |
| SUBGROUP 2B | |
| | % |
| Ingredient 4 | 15 |
| Ingredient 10 | 10 |
| Ingredient 6 | 75 |
| | |
| SUBGROUP 2C | |
| | % |
| Subgroup 2A | 10 |
| Subgroup 2B | 90 |
| | |
| Group 2 | % |
| | |
| Subgroup 2C | 92 |
| Ingredient 7 | 6 |
| Ingredient 8 | 2 |

| INGREDIENT VOLUME REQUIREMENT | |
|---|---|
| | |
| | Tons |
| Ingredient 1 | 237 |
| Ingredient 2 | 16 |
| Ingredient 3 | 26 |
| Ingredient 4 | 139 |
| Ingredient 5 | 23 |
| Ingredient 6 | 625 |
| Ingredient 7 | 80 |
| Ingredient 8 | 25 |
| Ingredient 9 | 17 |
| Ingredient 10 | 62 |

FIG. 3

MULTIPLE PRODUCT, MULTIPLE STEP OPTIMIZATION METHODS

CROSS REFERENCE TO RELATED APPLICATIONS

This application is a national stage application under 35 U.S.C. §371 of PCT/US2008/003990 filed Mar. 27, 2008, which claims priority to U.S. Provisional Application Ser. No. 60/925,310 filed Apr. 19, 2007 and to U.S. Provisional Application Ser. No. 60/958,323 filed Jul. 3, 2007, the disclosures of which is incorporated herein by this reference.

BACKGROUND OF THE INVENTION

1. Field of the Invention

This invention relates generally to optimization methods and particularly to multiple product, multiple step optimization methods useful for optimizing the manufacture of foods and other products.

2. Description of Related Art

Product formulations are typically created to meet specific physical and chemical product characteristics. For example, food formulations are created to meet specific consumer nutritional, sensory, and physical requirements. Historically, manufacturers recognized the potential of additional economic value by utilizing commodity ingredients for product formulations. The commodities (e.g. unprocessed or processed goods such as meats, cereals, grains, fruits, and vegetables) have varying nutritional, sensory, physical, cost, and availability characteristics at any or various time. To produce product formulations with the desired nutritional, sensory, and physical characteristics while utilizing commodities with varying nutrition, sensory, physical, cost, and availability characteristics, single step optimization methods have conventionally been used for single or multiple product optimizations. However, as the manufacture of products became more complex, the single step, single product and single step, multiple product optimization methods became inadequate for the more complex manufacturing methods. There is, therefore, a need for optimization methods for multiple product, multiple step manufacturing processes.

SUMMARY OF THE INVENTION

The present invention is generally directed to multiple product, multiple step optimization methods and methods of optimizing formulations using the optimization methods, particularly food formulations such as pet food formulations. In an embodiment, the present invention provides an optimization method for manufacturing products. The method comprises defining a first group and a second group and common constraints between the groups. The first and second groups each comprise at least two subgroups. At least one of the subgroups for each group comprises at least one variable and at least one constraint. The variables are optimized based on one more defined objectives. The first and second groups are optimized to obtain final values for the variables based on the defined objective subject to the constraints defined for each group. defining common constraints between the groups In an embodiment, two or more the variables of the same subgroup as a whole are subjected to one or more of the same constraints. All of the subgroups of each group as a whole can also be subject to one or more of the same constraints. The first group and the second group as a whole can also be subject to one or more of the same constraints.

In an embodiment, the defined objective is minimizing the cost of the overall manufacturing processes of the products. In addition, the defined objective can be minimizing the cost of the manufacturing process with respect to a specific variable of the manufacturing process. Similarly, the defined objective can be minimizing or maximizing a specific variable of the manufacturing process. The defined objective can also include other suitable objectives, for example, controlling variability within a manufacturing process.

In an embodiment, the first group and the second group comprise requirements of food formulations, preferably pet food formulations. In one embodiment, the variables of the first and second groups each comprise ingredients of the food formulations.

In another embodiment, the invention provides a method of optimizing pet food formulations. The method comprises defining a first pet food formulation and a second pet food formulation. The first and second pet food formulations each comprise at least two subgroups. At least one of the subgroups for each formulation comprises at least one variable and at least one constraint. The variables are optimized to obtain final values based on the defined objective of the first and second pet food formulations subject to the constraints.

In one embodiment, the method further comprises obtaining final values for the variables of the first and second pet food formulations based on optimizing the variables when the operations are completed. In an embodiment, each of the variables comprises an amount of an individual ingredient. In an embodiment, at least one of the constraints is defined by a characteristic of an individual ingredient or group of ingredients. For example, the constraints can be defined by a range limitation (e.g. minimum and maximum) of the individual ingredients.

In an embodiment, at least one of the constraints is defined by a single characteristic of the individual ingredient or group of ingredients such as, for example, nutritional, sensory, physical, regulatory requirement, and availability.

In an embodiment, one or more of the constraints is defined by a characteristic such as, for example, formulation volume requirement, formulation logistics, ingredient storage limitations, location of ingredients and factory product limitations. One or more of the constraints may be based on a quality characteristic of the pet food formulation.

In an alternative embodiment, the present invention provides a method of optimizing pet food formulations. The method comprises defining a plurality of pet food formulations with each pet food formulation comprising a plurality of subgroups. At least one of the subgroups of each pet food formulation comprises at least one ingredient variable and at least one constraint. The variables are optimized based on a defined objective for the pet food formulations subject to the constraints. Final values for the variables of the pet food formulations are obtained.

In yet another embodiment, the present invention provides an optimization method comprising defining a first group and a second group. The first and second groups each comprise a plurality of subgroups. Each subgroup comprises a plurality of variables and a plurality of constraints. The variables are optimized based on a defined objective for the first and second groups subject to the constraints.

In still another embodiment, the present invention provides an optimization method comprising defining a plurality of groups with each group comprising at least two subgroups. Each subgroup comprises at least one variable and at least one constraint. The variables are optimized based on a defined objective subject to the constraints. Final values are obtained for the variables of the groups based on optimizing the variables with respect to the defined objective.

An advantage of the present invention is to provide improved optimization methods. Another advantage of the present invention is to provide improved methods for optimizing food formulations. Yet another advantage of the present invention is to provide improved methods for optimizing pet food formulations. Still another advantage of the present invention is to provide methods for determining optimal amounts for ingredients for two or more pet food formulations. Another advantage of the present invention is to provide methods for determining least cost distributions of ingredients for two or more pet food formulations.

These and other and further objects, features, and advantages of the present invention will be readily apparent to those skilled in the art.

BRIEF DESCRIPTION OF THE DRAWINGS

FIG. 2 also illustrates examples of requirements for both pet food Formula #1 and pet food Formula #2.

FIG. 3 illustrates final optimized values for the ingredients of Formulas #1 and #2 using the multiple product, multiple step optimization method in an embodiment of the present disclosure.

DETAILED DESCRIPTION OF THE INVENTION

Figure 1:
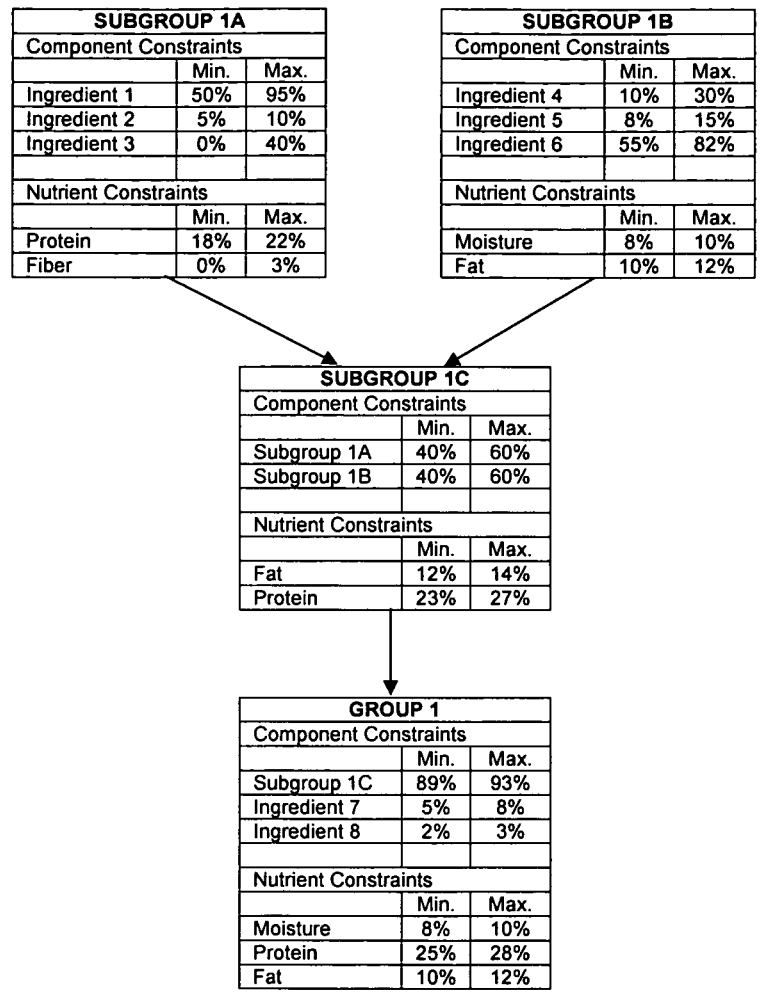
FIG. 1 illustrates a flowchart of a pet food Formula #1 made at manufacturing plant 1 using the multiple product, multiple step optimization method in an embodiment of the present disclosure.

The present invention provides multiple product, multiple step optimization methods and methods of optimizing formulations using the optimization methods, particularly food formulations such as pet food formulations. For example, in embodiments, the invention provides methods for solving multiple product, multiple step blending and/or product manufacturing problems.

Many types of products include commodity ingredients in their formulations. For example, for food products, commodities can by definition have varying nutritional, sensory, physical, cost, and availability characteristics at any time. To take economic advantage of commodity fluctuations in the market, product buyers and product formulators use optimization tools to help solve the many business problems that result from the use of commodities. Given an increasingly sophisticated set of product formulations, this requires computerized systems that can solve very large, nonlinear, non-convex, smooth type blending problems very quickly.

In an embodiment, the present invention provides an optimization method for a manufacturing process comprising defining a first group and a second group and common constraints between the groups. The first group and the second group can each correspond to an individual product that is made by the manufacturing process. The first and second groups each can comprise two or more subgroups. For example, the subgroups can be individual components or ingredients of the products. At least one of the subgroups for each group comprises one or more variables and one or more constraints.

As used herein, the term "variable" means a quantity or function that may assume any given value or set of values. The variable may be associated with one or more constraints and/or constants that define the variable. For example, if the variable is an ingredient such as chicken used in a food product, the ingredient chicken can further be defined by its nutritional content, e.g. fat content, calorie content, protein content, and the like.

The constraints can be based on or define the variables. For example, the constraints can be based on a range limitation of the individual variables. Alternatively, the constraints can be based on one or more qualities or characteristics of the variables, subgroups and/or groups. In conjunction with the previous example, if the ingredient chicken is a variable, a corresponding constraint can be that the chicken must range from 5% to 15% of a subgroup or group along with other ingredients.

Each subgroup can be based, for example, on an individual operation of a manufacturing process. In other words, each subgroup may comprise the ingredients used in an individual operation, which can provide further constraints that the one or more of the variables of the first and second groups are subject to. The operations can comprise, for example, manufacturing processes typically associated with the groups that are being optimized. For example, if the groups are pet food formulations, the operations can comprise mixing, extruding, drying and/or coating.

Once the variables and constraints have been determined, one or more objectives can be defined. The method can further comprise obtaining final overall values for the variables of the first and second groups based on optimizing the variables with respect to the defined objectives. For example, the defined objective can be minimizing manufacturing costs of the food formulations. Accordingly, the final values of the variables will be an amount of the ingredients that result in the least cost in the manufacturing of the products.

In another embodiment, the defined objective can be minimizing the manufacturing costs of the products with respect to one or more of the components or ingredients of the products. For example, the minimal cost for manufacturing the products can be optimized with respect to increasing or decreasing one or more specific components or ingredients of the products that are manufactured.

Final optimal values for the variables in each group can be determined as a result of the optimization of the subgroups and groups as a whole based on the defined objectives. Accordingly, this method can involve multiple products and multiple steps as a way of more accurately and efficiently solving complex blending type problems having numerous variables and constraints.

Any of the steps described in alternative embodiments herein can be performed using capable computer programs or software on any suitable computer. Preferably, the computer comprises a high speed processor for performing the calculations. Because these multiple product, multiple step blending problems can involve thousands of variables and thousands of constraints, software comprising algorithms that solve smooth non-linear optimization type problems with no fixed limits on the number of variables and constraints should be used. Conventional software currently comprising these high level algorithms includes the Premium Solver Platform from Frontline Systems, Inc, utilizing the KNITRO® Solver Engine, also from Frontline Systems, Inc. It should be appreciated that any suitable computerized software capable of solving large scale smooth non-linear problems with numerous variables and constraints can also be used. In order to incorporate the problem solving software, a computerized system (e.g. application written using a programming language like Visual Basic and other tools like Microsoft Excel)

can be developed to input or retrieve, defined multiple groups and operation and desired variables and constraints for the groups, subgroups and operations into a working area or database while incorporating the optimization algorithm to solve any desired multiple product, multiple step problems using the inputted information.

Figure 2:
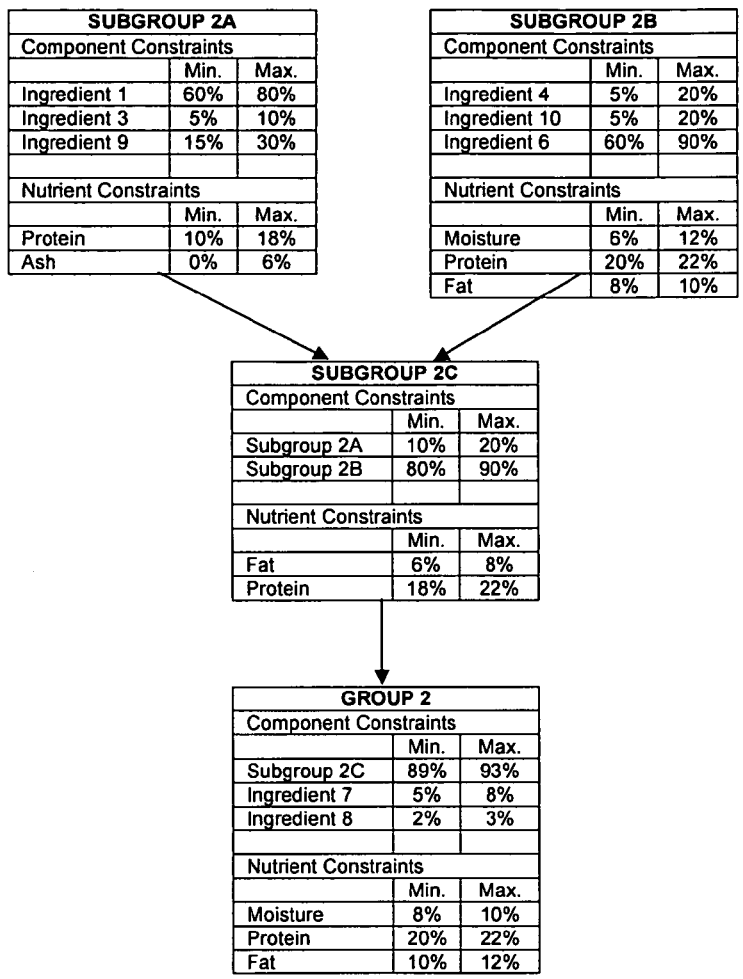
FIG. 2 illustrates a flowchart of another pet food Formula #2 made at manufacturing plant 2 in conjunction with the pet food Formula #1 using the multiple product, multiple step optimization method in an embodiment of the present disclosure.

In one embodiment, the present invention provides a method of optimizing pet food formulations, for example, using the optimization algorithm previously discussed. Referring now to FIGS. 1-3, the method in an embodiment comprises defining a first pet food Formula #1 made at manufacturing plant 1 (shown in FIG. 1) and a second pet food Formula #2 made at manufacturing plant 2 (shown in FIG. 2). Pet food formulas #1 and #2 each comprise two or more subgroups. The subgroups are shown in FIGS. 1-2 as 1A, 1B, 1C, 2A, 2B and 2C.

The subgroups for each pet food formula comprise one or more variables (e.g. ingredients) and one or more constraints (e.g. minimum and maximum levels). The constraints can be based on or limit any one or more qualities or characteristics of one or more of the variables within each subgroup. For example, each individual variable of a subgroup or all of the variables of the same subgroup can be subject to one or more constraints placed on that subgroup. The constraints can also be based on or limit the combined variables that make up an entire group. For example, the entire group or groups (e.g. formulas #1 and/or #2) can be subject to overall constraints. The variables are optimized to obtain final values for the variables of the first and second pet food formulas based on a defined objective subject to the constraints. The defined objective can be, for example, minimizing the overall cost of producing a pet food having formulas #1 and #2 at manufacturing plants 1 and 2, respectively.

More specifically, each of the variables comprises an amount of an individual ingredient for a pet food formula. Each formula, for example, can be based on a product made in a designated manufacturing facility. As shown in FIG. 1, Formula #1 represents a pet food product made in manufacturing plant 1. Formula #1 can be divided into 3 subgroups 1A through 1C. Subgroup 1A comprises the following variables: ingredient #1, ingredient #2 and ingredient #3 subject to component constraints for the individual ingredients and nutrient constraints for the entire subgroup 1A. Similarly, subgroup 1B comprises the following variables: ingredient #4, ingredient #5 and ingredient #6 subject to component constraints for the individual ingredients and nutrient constraints for the entire subgroup 1B.

Subgroup 1C comprises the following variables: subgroup 1A and subgroup 1B subject to component constraints for the individual subgroups and nutrient constraints for the entire subgroup 1C. Finally, subgroup 1C along with additional ingredients #7 and #8 are subject to individual component constraints and the variables of Formula #1 are subject to overall nutrient constraints as defined in Group 1.

As shown in FIG. 2, Formula #2 represents another pet food product made in manufacturing plant 2 that shares ingredients with Formula #1 from manufacturing plant 1. Accordingly, an objective of using the multiple product, multiple step optimization method is to optimize the amount of ingredients for each plant based on the total availability of the ingredients and constraints placed on the ingredients for each subgroup.

Formula #2 can be divided into 3 subgroups 2A through 2C. Subgroup 2A comprises the following variables: ingredient #1, ingredient #3 and ingredient #9 subject to component constraints for the individual ingredients and nutrient constraints for the entire subgroup 2A. Similarly, subgroup 2B comprises the following variables: ingredient #4, ingredient #10 and ingredient #6 subject to component constraints for the individual ingredients and nutrient constraints for the entire subgroup 2B.

Subgroup 2C comprises the following variables: subgroup 2A and subgroup 2B subject to component constraints for the individual subgroups and nutrient constraints for the entire subgroup 2C. Finally, subgroup 2C along with additional ingredients #7 and #8 are subject to individual component constraints and the variables of Formula #2 are subject to overall nutrient constraints as defined in Group 2.

As further shown in FIG. 2, Group 1 and Group 2 can further be subject to additional overall or combined constraints. For example, Formula #1 has a production requirement of 500 tons, and Formula #2 has a production requirement of 750 tons. In addition, ingredients #4 and #7 are subject to availability constraints.

Although not listed, each ingredient can have a corresponding price associated with it as part of the optimization program, for example, depending on market conditions. Once the known nutrient and price attributes of the ingredients for each formula, the constraints for the one or more subgroups/groups and the defined objective are inputted into the software, a final distribution of the ingredients that meets the defined objective subject to all of the constraints can be calculated. In other words, if the defined objective is to minimize the cost of producing Formula #1 and #2 in manufacturing plants 1 and 2, respectively, a specific amount of each ingredient for each pet food formula will be determined that will optimize the ingredient allocation while minimizing cost as shown in FIG. 3.

As shown in FIG. 3, the final values for the individual variables are determined with respect to each subgroup. For example, the percentage of each ingredient with respect to each subgroup and group are provided. In addition, the final optimal volume requirements of each individual ingredient of Formula #1 and #2 are provided for the combined manufacturing processes 1 and 2. Accordingly, in accordance with embodiments of the present disclosure, the optimization calculations for at least two products are performed for the entire subgroups/groups concurrently to get the final optimized results.

Although a limited number of constraints are listed in FIGS. 1-2 for each group or sub-group, additional constraints or constants such as price or nutritional information can be preprogrammed for each ingredient/variable and/or unit operation so that once the variables/operations are selected, they will already include a number of predetermined constraints or constants such as a corresponding cost, nutritional composition, etc. This avoids having to repetitively add every constraint or constant for each ingredient or operation every time that ingredient or operation is chosen for a specific formula.

In an embodiment, the constraints for the individual variables of each group will be the minimum or maximum amount of the variable allowed. Other constraints that relate to the nutrition, sensory, physical properties and availability of the ingredients or final product can be applied to one or more of the subgroups/groups. Other factors such as, for example, formula volume requirements, formula logistics, ingredient storage limitations, location of ingredients and factory product limitations can also be added in the form of constraints that the subgroups/groups are subject to. In an embodiment, the defined objective is to minimize cost, although other defined objectives can also be utilized.

The optimization methods of the present invention are useful for optimizing the manufacturing processes for numerous products. Any process used to manufacture a product that is manufactured in a multiple step process and has constraints that cover multiple products can be optimized using the present invention, e.g., processes for the manufacture of foods, paints, resins, fertilizers, and the like.

In an embodiment, the foods made by the manufacturing processes can be any common food edible by an animal. Foods useful in the present invention can be prepared in a wet or containerized (e.g., canned or in pouches) form using conventional pet food processes. In one contemplated embodiment, ground animal (e.g., mammal, poultry, fish and/or seafood) proteinaceous tissues are mixed with other ingredients, including for example, animal fats and vegetable oils, cereal grains, other nutritionally balancing ingredients, and special purpose additives (e.g., vitamin and mineral mixtures, inorganic salts, bulking agents, and the like). Water sufficient for processing is also added. These ingredients typically are mixed in a vessel suitable for heating while blending the components. Heating of the mixture can be effected in any suitable manner, such as, for example, by direct steam injection or by using a vessel fitted with a heat exchanger. Following addition of the last of these ingredients, the mixture can be heated in a pre-cooking step to a temperature of up to about 100° C. Higher temperatures can be acceptable, but can be commercially impractical without use of other processing aids. When heated to the appropriate temperature, the material is typically in the form of a thick liquid. The thick liquid is filled into suitable containers such as cans, jars, pouches or the like. A lid is applied, and the container is hermetically sealed. The sealed containers are then placed into conventional equipment designed to sterilize the contents. This is usually accomplished by heating to a temperature of at least about 110° C. for an appropriate time, which is dependent on, for example, the temperature used and the composition. Products can also be prepared by an aseptic process wherein the contents are heated to commercial sterility before being packaged in sterilized containers.

Foods useful in the present invention can be prepared in a dry form using conventional processes. In one embodiment, dry ingredients, including, for example, animal protein sources, plant protein sources, grains, etc., are ground and mixed together. Moist or liquid ingredients, including fats, oils, animal protein sources, minerals, water, etc., are then added to and mixed with the dry mix. The mixture is then processed into kibbles or similar dry pieces. Kibble is often formed using an extrusion process in which the mixture of dry and wet ingredients is subjected to mechanical work at a high pressure and temperature, and forced through small openings and cut off into kibble by a rotating knife. The wet kibble is then dried and optionally coated with one or more topical coatings which can include, for example, flavors, fats, oils, powders, and the like. Kibble also can be made from the dough using a baking process, rather than extrusion, wherein the dough is placed into a mold before dry-heat processing. Kibble also can be made from a food matrix undergoing pelletization.

This invention is not limited to the particular methodology, protocols, and reagents described herein because they may vary. Further, the terminology used herein is for the purpose of describing particular embodiments only and is not intended to limit the scope of the present invention. As used herein and in the appended claims, the singular forms "a," "an," and "the" include plural reference unless the context clearly dictates otherwise, e.g., reference to "a method" or "a food" includes a plurality of such methods or foods. Similarly, the words "comprise", "comprises", and "comprising" are to be interpreted inclusively rather than exclusively.

Unless defined otherwise, all technical and scientific terms and any acronyms used herein have the same meanings as commonly understood by one of ordinary skill in the art in the field of the invention. Although any methods and materials similar or equivalent to those described herein can be used in the practice of the present invention, the preferred methods, devices, and materials are described herein.

All patents, patent applications, and publications mentioned herein are incorporated herein by reference to the extent allowed by law for the purpose of describing and disclosing the compounds, processes, techniques, procedures, technology, articles, and other compositions and methods disclosed therein that might be used with the present invention. However, nothing herein is to be construed as an admission that the invention is not entitled to antedate such disclosure by virtue of prior invention.

In the specification there have been disclosed typical preferred embodiments of the invention and, although specific terms are employed, they are used in a generic and descriptive sense only and not for purposes of limitation, the scope of the invention being set forth in the following claims. Obviously many modifications and variations of the present invention are possible in light of the above teachings. It is therefore to be understood that within the scope of the appended claims the invention may be practiced otherwise than as specifically described.

What is claimed is:

1. A computer-implemented optimization method for manufacturing food products comprising:
   defining a first group comprising at least two subgroups, at least one of the subgroups of the first group comprising at least one variable and at least one constraint;
   defining a second group comprising at least two subgroups, at least one of the subgroups of the second group comprising at least one variable and at least one constraint, wherein the first group comprises a first pet food formulation and the second group comprises a second pet food formulation, and wherein the variables of the first and second groups each comprise a single ingredient of the first and second pet food formulations;
   defining at least one common constraint between the first and second groups;
   optimizing the variables using a computer processor to obtain final values for the variables of the first group and the second group based on a defined objective subject to the at least one common constraint of the first group and the second group; and
   optimizing the first pet food formulation and the second formulation based on the final values for the variables of the first group and the second group.

2. The method of claim 1 wherein the defined objective is minimizing manufacturing costs of the food products.

3. The method of claim 1 wherein the constraints of the respective first group and the second group are based on the variables of the respective first group and the second group.

4. The method of claim 1 wherein two or more of the variables of the same subgroup of the respective first group or the second group are subjected to one or more of the same constraints of the respective first group or the second group.

5. The method of claim 1 wherein all of the subgroups of the respective first group or the second group are subject to one or more of the same constraints of the respective first group or the second group.

6. The method of claim 1 wherein the at least one variable of the first group and the at least one variable of the second group are optimized concurrently.

7. The method of claim 1 wherein the first pet food formulation and the second pet food formulation are optimized concurrently.

8. A computer-implemented method of optimizing food formulations comprising:
   defining a first food formulation comprising at least two subgroups, at least one of the subgroups of the first food formulation comprising at least one variable and at least one constraint;
   defining a second food formulation comprising at least two subgroups, at least one of the subgroups of the second food formulation comprising at least one variable and at least one constraint;
   defining at least one common constraint between the first and second food formulations;
   optimizing the variables using a computer processor to obtain final values for the variables of the first and second food formulations based on a defined objective subject to the at least one common constraint of the first and second food formulations; and
   optimizing the first food formulation and the second food formulation based on the final values for the variables of the first food formulation and the second food formulation.

9. The method of claim 8 wherein the defined objective is minimizing manufacturing costs of the first and second food formulations.

10. The method of claim 8 wherein the defined objective is minimizing manufacturing costs of the first and second food formulations with respect to one or more of the variables of the first and second food formulations.

11. The method of claim 8 wherein each of the variables of the first and second food formulations comprise an amount of an individual ingredient.

12. The method of claim 11 wherein at least one of the constraints of the first or second food formulations is defined by a range requirement of the individual ingredient.

13. The method of claim 11 wherein at least one of the constraints of the first or second food formulations is defined by a single characteristic of the individual ingredient selected from the group consisting of nutritional, sensory, physical, regulatory requirement, availability and combinations thereof.

14. The method of claim 8 wherein at least one of the constraints of the first or second food formulations is defined by a characteristic selected from the group consisting of formulation volume requirement, formulation logistics, ingredient storage limitations, location of ingredients, factory product limitations and combinations thereof.

15. The method of claim 8 wherein at least one of the constraints of the first or second food formulations is based on a quality of the food formulation.

16. The method of claim 8 wherein the food formulation is a pet food formulation.

17. A computer-implemented method of optimizing food formulations comprising:
   defining a plurality of food formulations, each food formulation comprising a plurality of subgroups, at least one of the subgroups of each food formulation comprising at least one ingredient variable and at least one constraint;
   defining at least one common constraint between the plurality of food formulations; and
   obtaining final values for the variables of the food formulations based on optimizing the variables based on a defined objective using a computer processor, wherein the defined objective is minimizing manufacturing costs of the food formulations, and the optimizing is subject to the at least one common constraint; and
   optimizing each of the food formulations based on the final values for the variables of the food formulations.

18. The method of claim 17 wherein the defined objective is minimizing manufacturing costs of the food formulations with respect to one or more of the variables.

* * * * *